United States Patent
Wang et al.

(10) Patent No.: US 11,496,463 B2
(45) Date of Patent: Nov. 8, 2022

(54) INFORMATION PROCESSING TERMINAL, INFORMATION PROCESSING DEVICE, INFORMATION PROCESSING METHOD, AND INFORMATION PROCESSING SYSTEM

(71) Applicant: SONY CORPORATION, Tokyo (JP)

(72) Inventors: Qihong Wang, Tokyo (JP); Masatomo Kurata, Tokyo (JP); Taizo Shirai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 458 days.

(21) Appl. No.: 16/342,104

(22) PCT Filed: Sep. 19, 2017

(86) PCT No.: PCT/JP2017/033754
§ 371 (c)(1),
(2) Date: Apr. 15, 2019

(87) PCT Pub. No.: WO2018/096772
PCT Pub. Date: May 31, 2018

(65) Prior Publication Data
US 2019/0253413 A1 Aug. 15, 2019

(30) Foreign Application Priority Data

Nov. 22, 2016 (JP) .............................. JP2016-226581

(51) Int. Cl.
*H04L 29/06* (2006.01)
*H04L 9/40* (2022.01)
(Continued)

(52) U.S. Cl.
CPC .......... *H04L 63/0853* (2013.01); *G06F 21/32* (2013.01); *G06F 21/44* (2013.01);
(Continued)

(58) Field of Classification Search
None
See application file for complete search history.

(56) References Cited

U.S. PATENT DOCUMENTS

| 8,135,624 | B1 * | 3/2012 | Ramalingam ...... G06Q 30/0256 705/26.1 |
| 10,262,505 | B1 * | 4/2019 | Gopalakrishna .... G07F 19/2055 |

(Continued)

FOREIGN PATENT DOCUMENTS

| CN | 102521619 A | 6/2012 |
| CN | 102523213 A | 6/2012 |

(Continued)

OTHER PUBLICATIONS

Meredith Popolo, "The Best iPhone Armbands for Runners", PCMag, Nov. 2013. (Year: 2013).*

(Continued)

*Primary Examiner* — Piotr Poltorak
(74) *Attorney, Agent, or Firm* — Chip Law Group

(57) ABSTRACT

There is provided an information processing terminal including an acquisition unit that acquires biometric information for biometric authentication and identification information of a device to which a service is supplied, and a transmission unit that transmits the identification information in accordance with success of the biometric authentication.

6 Claims, 9 Drawing Sheets

(51) Int. Cl.
*G06F 21/32* (2013.01)
*G06F 21/44* (2013.01)
*G06V 40/12* (2022.01)

(52) U.S. Cl.
CPC .......... *G06V 40/12* (2022.01); *H04L 63/0492* (2013.01); *H04L 63/0861* (2013.01); *H04L 63/0876* (2013.01)

(56) References Cited

U.S. PATENT DOCUMENTS

| | | | | |
|---|---|---|---|---|
| 2002/0130150 | A1* | 9/2002 | Stanley | H04B 1/385 224/600 |
| 2003/0037264 | A1 | 2/2003 | Ezaki et al. | |
| 2004/0006655 | A1* | 1/2004 | Toffolet | H04M 1/673 710/1 |
| 2014/0337221 | A1* | 11/2014 | Hoyos | G07F 19/20 705/44 |
| 2015/0074797 | A1* | 3/2015 | Choi | G06F 21/32 726/19 |
| 2016/0132851 | A1* | 5/2016 | Desai | G06Q 20/3227 705/21 |
| 2017/0330169 | A1* | 11/2017 | Eronen | G06Q 20/3224 |
| 2019/0253413 | A1 | 8/2019 | Wang et al. | |

FOREIGN PATENT DOCUMENTS

| | | |
|---|---|---|
| CN | 104935769 A | 9/2015 |
| JP | 2003-058509 A | 2/2003 |
| JP | 2005-139824 A | 6/2005 |
| JP | 2005-323070 A | 11/2005 |
| JP | 3951920 B2 | 8/2007 |
| JP | 2008-047022 A | 2/2008 |
| JP | 2008-065644 A | 3/2008 |
| WO | 2018/096772 A1 | 5/2018 |

OTHER PUBLICATIONS

International Search Report and Written Opinion of PCT Application No. PCT/JP2017/033754, dated Nov. 28, 2017, 07 pages of ISRWO.

Office Action for JP Patent Application No. 2018-552429, dated Aug. 17, 2021, 04 pages of English Translation and 04 pages of Office Action.

Office Action for CN Patent Application No. 201780070573.3, dated Apr. 13, 2022, 11 pages of English Translation and 11 pages of Office Action.

* cited by examiner

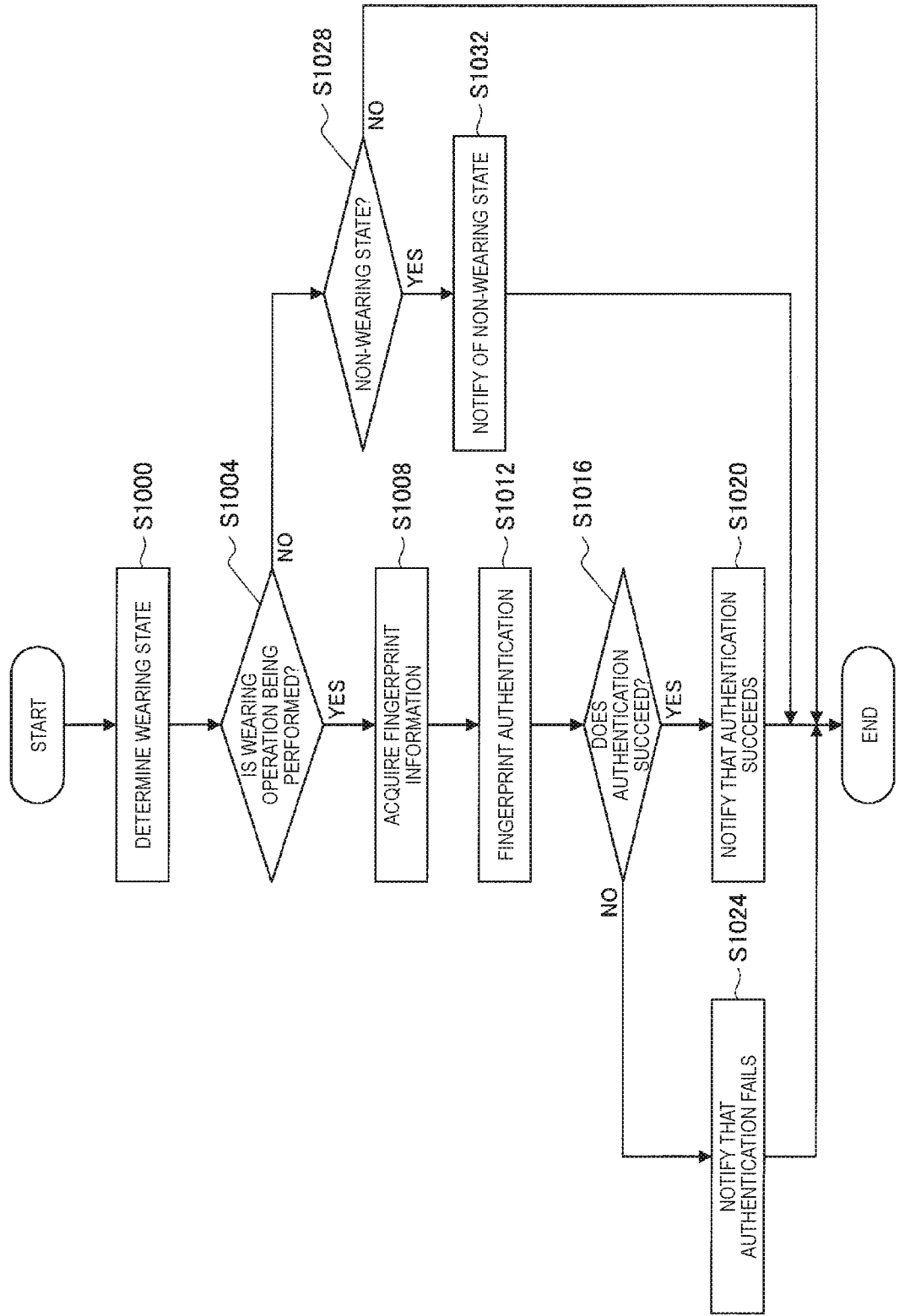

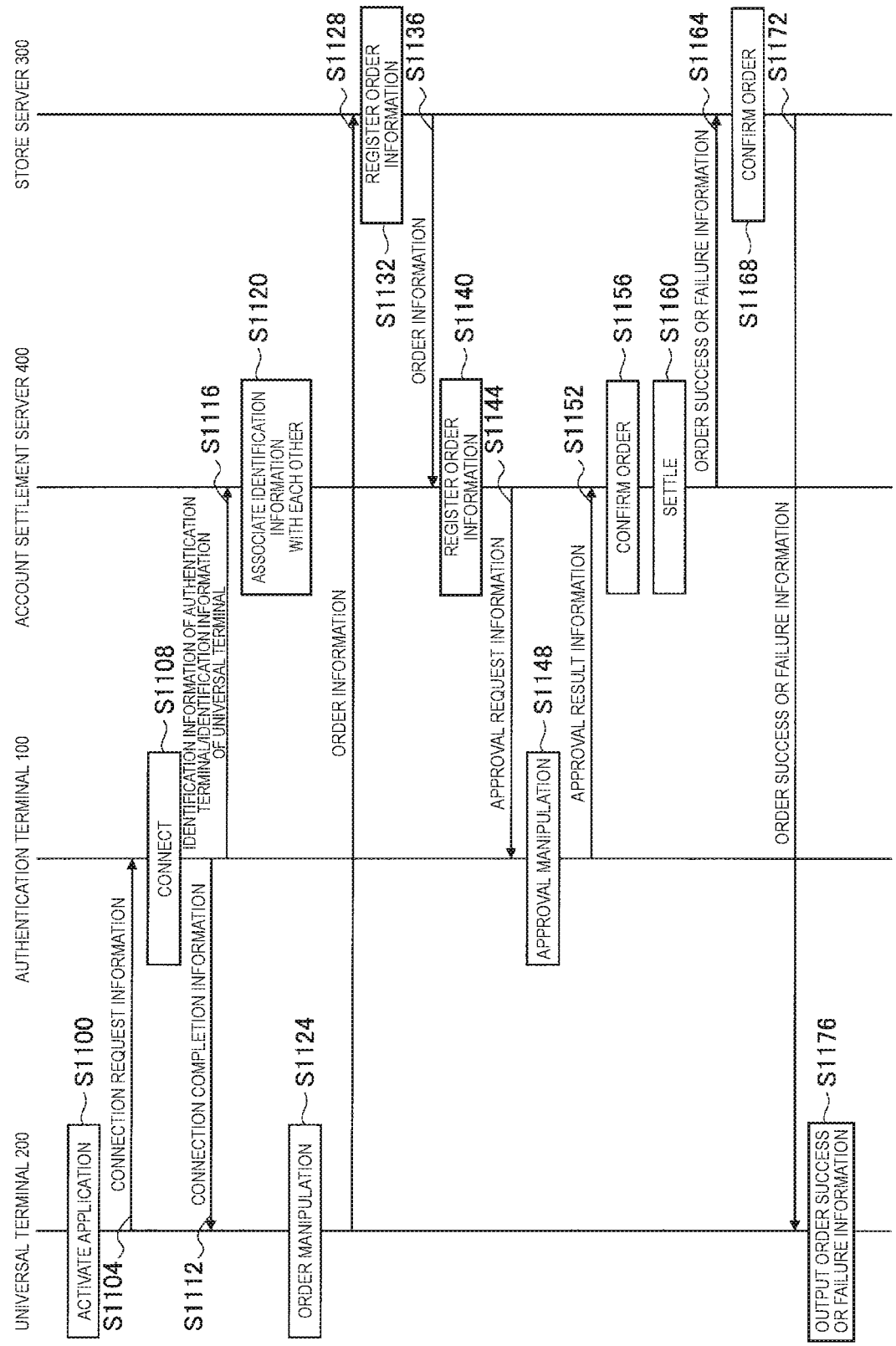

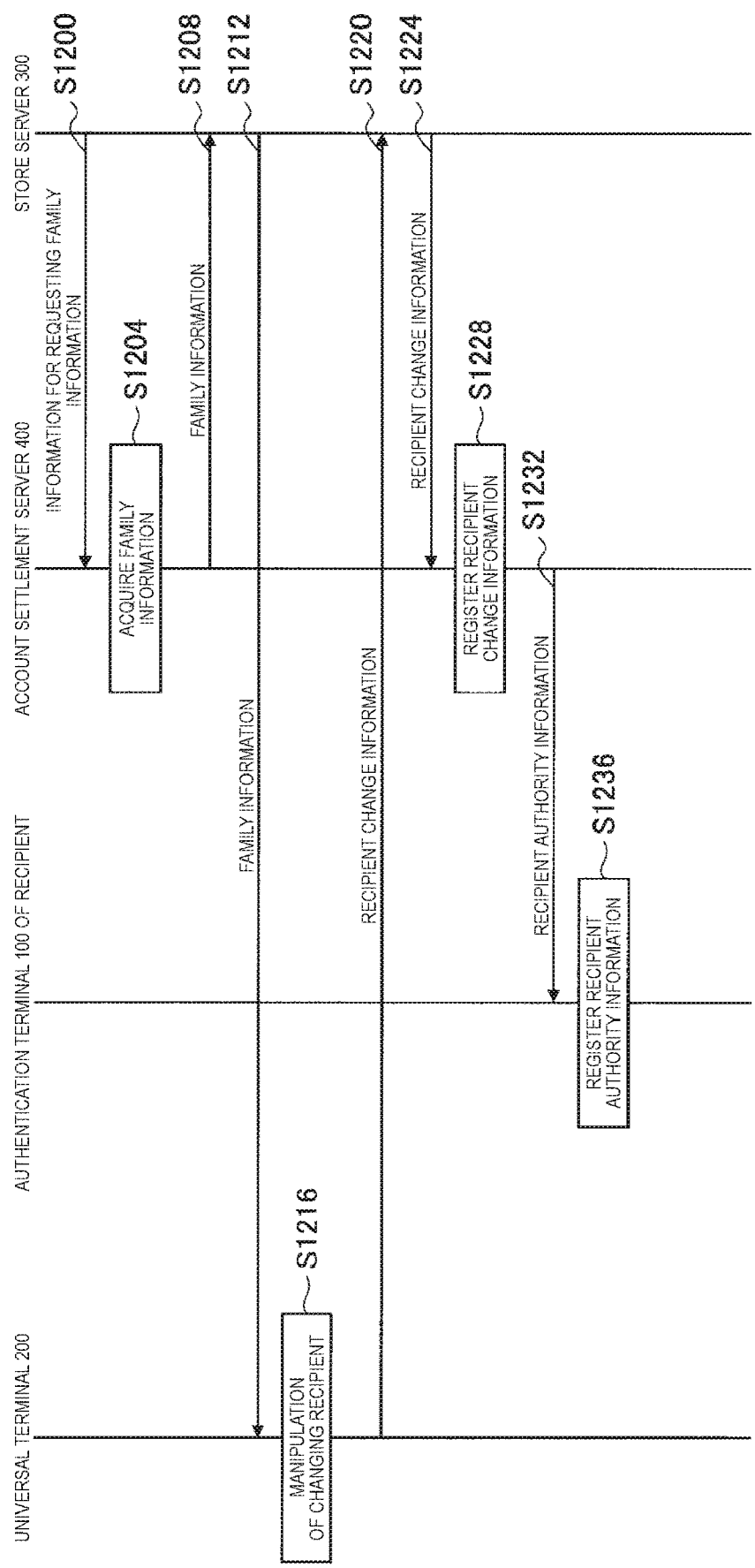

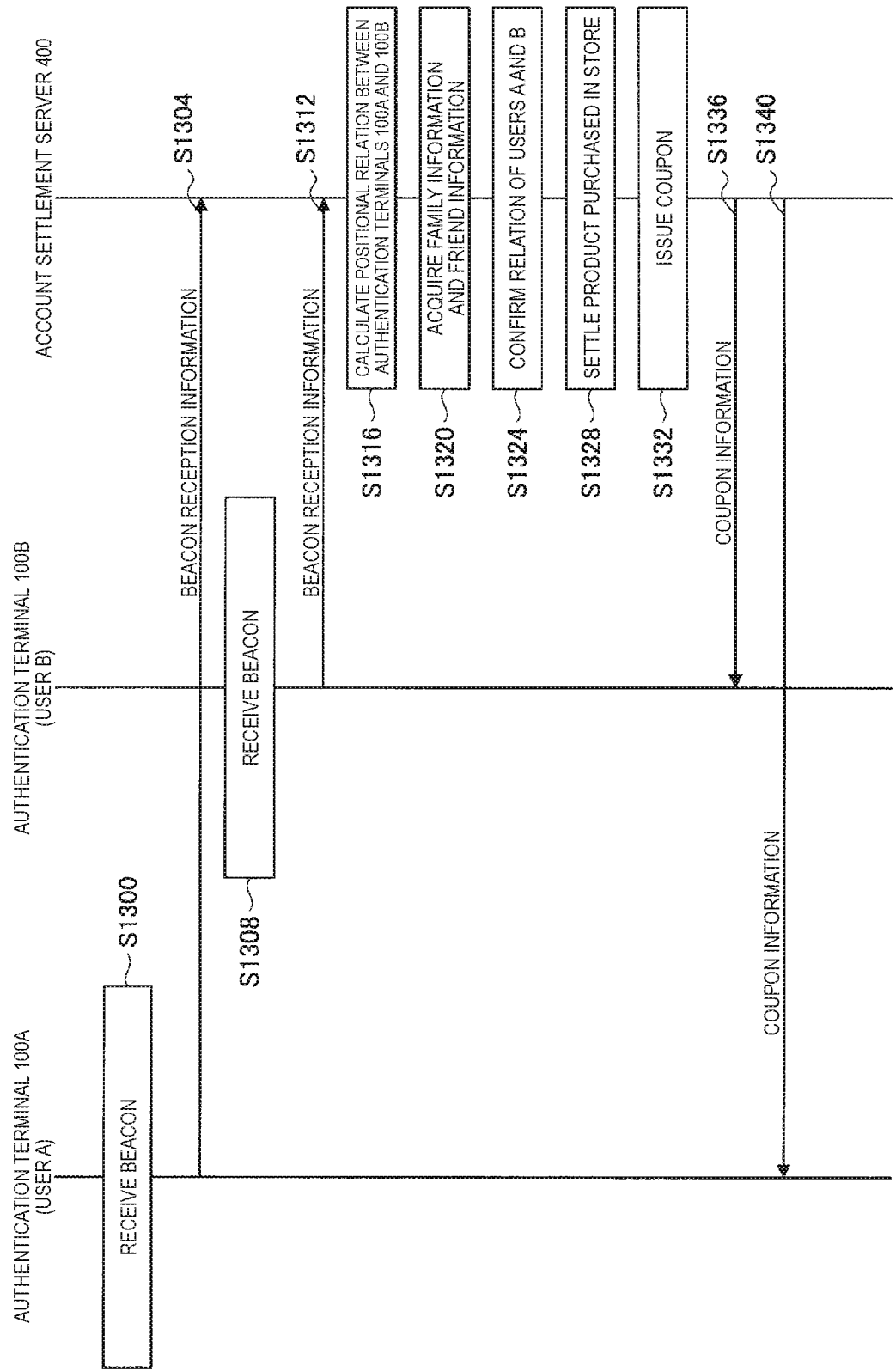

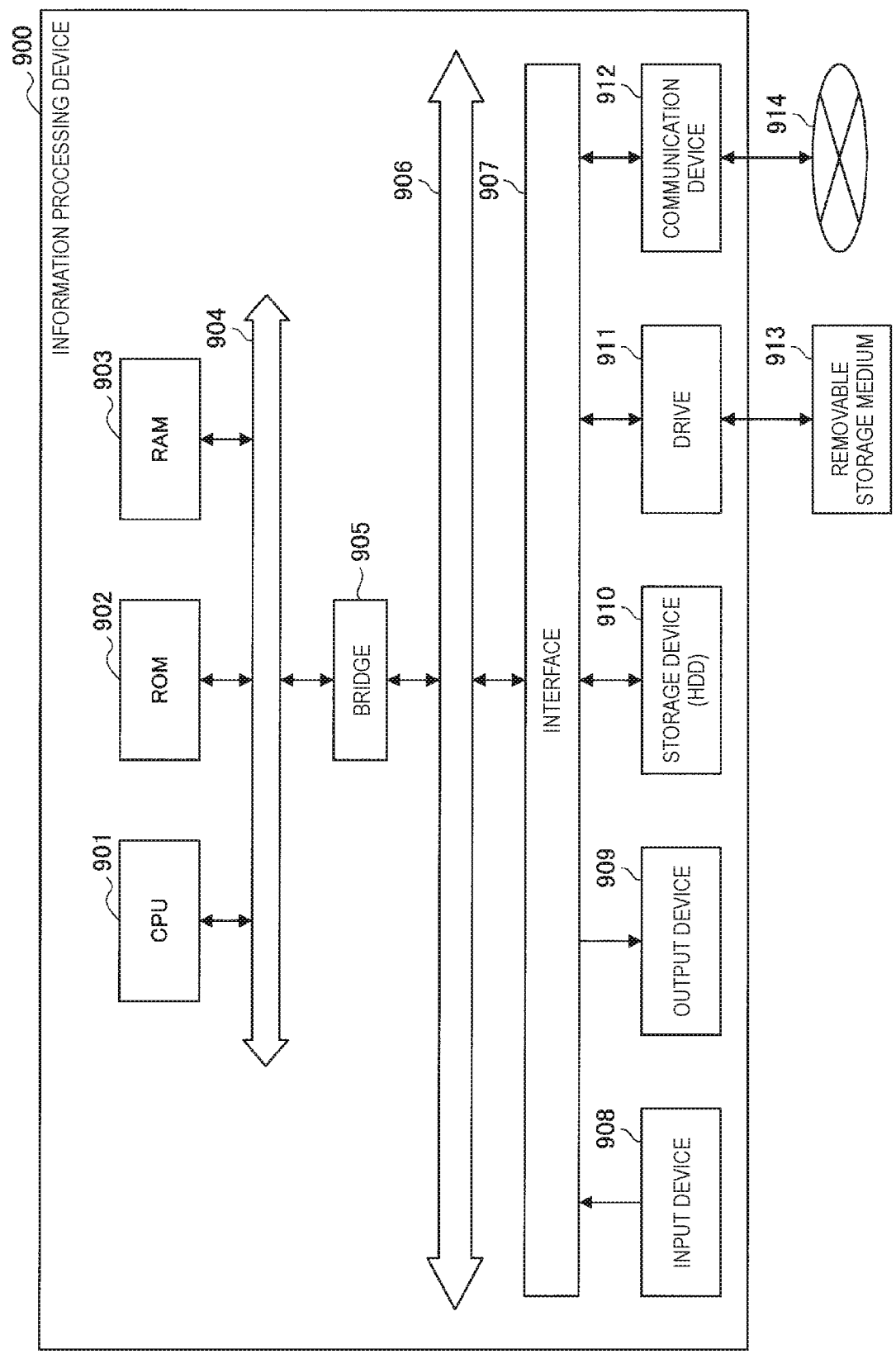

INFORMATION PROCESSING TERMINAL, INFORMATION PROCESSING DEVICE, INFORMATION PROCESSING METHOD, AND INFORMATION PROCESSING SYSTEM

CROSS REFERENCE TO RELATED APPLICATIONS

This application is a U.S. National Phase of International Patent Application No. PCT/JP2017/033754 filed on Sep. 19, 2017, which claims priority benefit of Japanese Patent Application No. JP 2016-226581 filed in the Japan Patent Office on Nov. 22, 2016. Each of the above-referenced applications is hereby incorporated herein by reference in its entirety.

TECHNICAL FIELD

The present disclosure relates to an information processing terminal, an information processing device, an information processing method, an information processing system, and a program.

BACKGROUND ART

In recent years, technologies for biometric authentication have been utilized in various devices, systems, or the like. For example, Patent Literature 1 discloses a technology for adding a fingerprint authentication function to various devices.

In addition, cases in which technologies for biometric authentication are utilized even when users use services or the like have increased. For example, cases in which users log in to desired application services by biometric authentication when using the application services using personal computers (PCs) or smartphones or the like can be exemplified.

CITATION LIST

Patent Literature

Patent Literature 1: JP 3951920B

DISCLOSURE OF INVENTION

Technical Problem

However, in the foregoing cases, biometric information used for biometric authentication may not be unified. For example, users have to register information about themselves including the biometric information used for biometric authentication (hereinafter also referred to as "user information" for convenience) for each service and have to log in through the biometric authentication when they use the services in some cases. In these cases, burdens such as registration, authentication, and the like of user information are imposed on the users. On the other hand, service operators bear burdens of management or the like of the user information. Further, since the user information is scattered across services, a risk of leakage of the user information also occurs.

Accordingly, the prevent disclosure is devised in view of the foregoing circumstances and the present disclosure provides a novel and improved information processing terminal, information processing device, information processing method, information processing system, and program capable of unifying biometric information which is used for biometric authentication.

Solution to Problem

According to the present disclosure, there is provided an information processing terminal including: an acquisition unit configured to acquire biometric information for biometric authentication and identification information of a device to which a service is supplied; and a transmission unit configured to transmit the identification information in accordance with success of the biometric authentication.

In addition, according to the present disclosure, there is provided an information processing method that is performed by a computer, the information processing method including: acquiring biometric information for biometric authentication and identification information of a device to which a service is supplied; and transmitting the identification information in accordance with success of the biometric authentication.

In addition, according to the present disclosure, there is provided a program causing a computer to realize: acquiring biometric information for biometric authentication and identification information of a device to which a service is supplied; and transmitting the identification information in accordance with success of the biometric authentication.

In addition, according to the present disclosure, there is provided an information processing device including: an acquisition unit configured to acquire identification information of a second device supplied from a first device that has acquired biometric information for biometric authentication in accordance with success of the biometric authentication; and a service supply unit configured to supply a service to the second device on a basis of the identification information of the second device.

In addition, according to the present disclosure, there is provided an information processing system including: an information processing device configured to supply a service; a first device configured to perform a process related to biometric authentication; and a second device to which the service is supplied. The first device includes an acquisition unit that acquires biometric information for the biometric authentication and identification information of the second device, and a transmission unit that transmits the identification information in accordance with success of the biometric authentication. The information processing device includes an identification information acquisition unit that acquires the identification information supplied from the first device in accordance with the success of the biometric authentication, and a service supply unit that supplies a service to the second device on a basis of the identification information.

Advantageous Effects of Invention

According to the present disclosure, as described above, it is possible to unify the biometric information which is used for biometric authentication.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 7 is a flowchart illustrating an authentication operation by the authentication terminal.

FIG. 8 is a sequence diagram illustrating an operation in a case in which a product is ordered using the information processing system according to the embodiment.

FIG. 9 is a sequence diagram illustrating an operation in a case in which a recipient of the product is changed using the information processing system according to the embodiment.

FIG. 10 is a sequence diagram illustrating an operation in a case in which a coupon is issued using the information processing system according to the embodiment.

FIG. 11 is a diagram illustrating a hardware configuration of devices according to the embodiment.

MODE(S) FOR CARRYING OUT THE INVENTION

Figure 1:
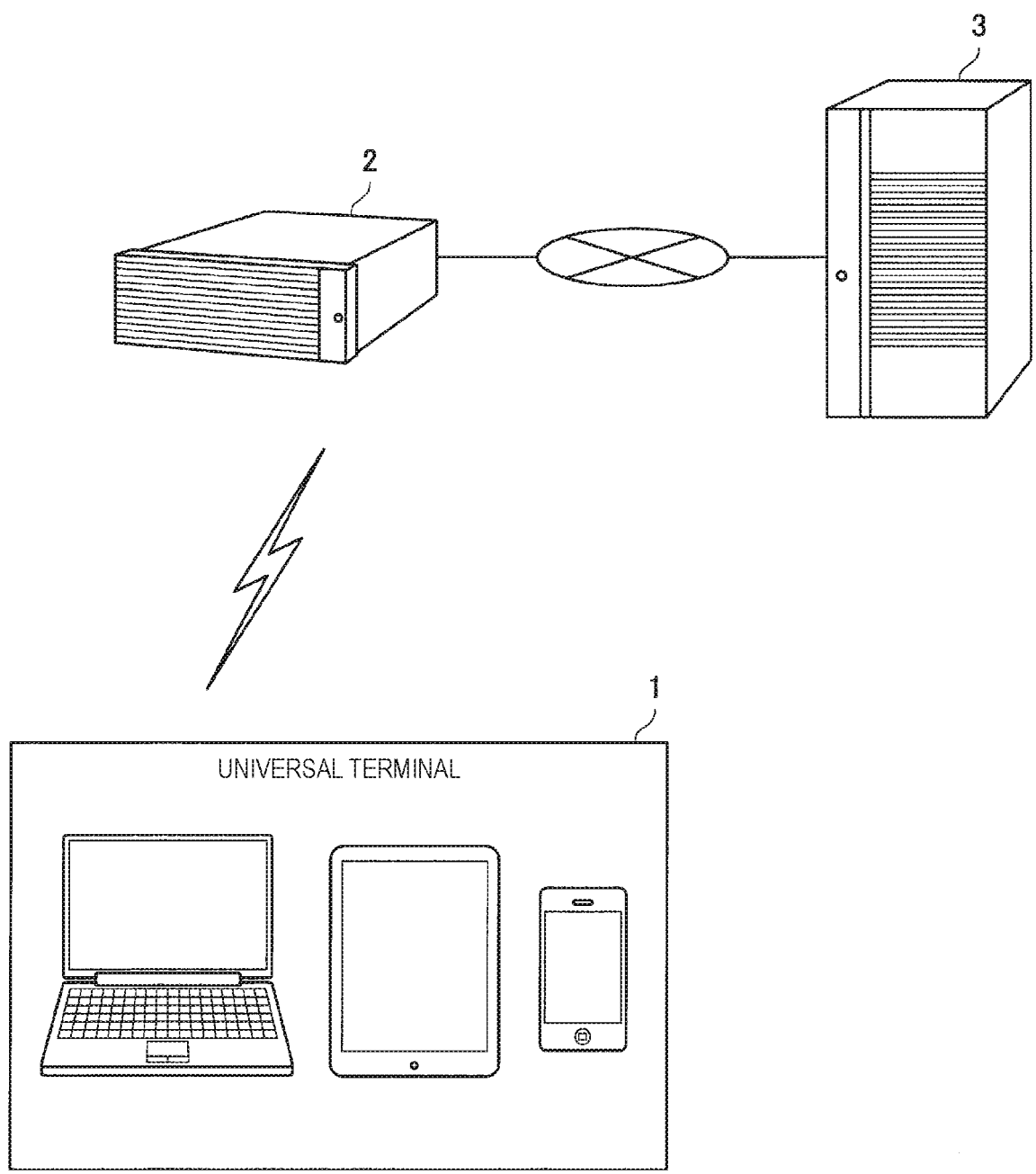
FIG. 1 is a diagram illustrating a configuration of an information system to describe a background of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.
1. Background
2. Overview of information processing system
3. Functional configuration of device
4. Operation of device
5. Hardware configuration
6. Conclusion

1. BACKGROUND

First, a background of the present disclosure will be described with reference to FIG. 1. FIG. 1 is a diagram illustrating a configuration of an information system to describe a background of the present disclosure. Here, for example, a case in which an information processing system is a shopping service system will be described.

As illustrated in FIG. 1, the information processing system includes a universal terminal 1, a store server 2, and a settlement server 3. The universal terminal 1 is a terminal that supplies a service. More specifically, a user can access the store server 2 using a predetermined application installed on the universal terminal 1 to use the service. At that time, the user is assumed to perform login by biometric authentication. The store server 2 is a device that is installed in a store or the like and controls an application such as a shopping site which is accessed by the universal terminal 1. The settlement server 3 is a device that performs a settlement process or the like for a shopping service. The settlement server 3 retains credit card information or the like of the user and performs the settlement process using the credit card information or the like in a case in which the user orders a product in the shopping service.

Here, since biometric information which is used for biometric authentication may not be unified in the information processing system in FIG. 1, users have to register user information including biometric information for each store (which is equivalent to "each service"). More specifically, users have to register attribute information of the users (names, ages, contact information, addresses, and the like), credit card information (kinds, numbers, validity periods, and the like), biometric information, and the like for each store in which they shop. Since such registration work requires considerable time and is complicated, a burden of the registration work on the users is not small. In addition, registration content in each store is the same or similar in many cases. Thus, since the users register the same or similar content a plurality of times, a psychological burden of the registration work on the users is not small. In addition, the registered user information is managed by the store sever 2 of each store. Therefore, in a case in which there is a store of which a security level is low, there is a possibility of the user information leaking. Further, when the users register the user information for each store, there is also a risk of the user information being acquired illegally by third parties or spread by viruses. In addition, the users have to perform a login manipulation by authentication for each store when using services.

In addition, in a case in which users visit a store to receives a product after ordering the product, the store server 2 supplies various numbers (enquiry numbers, authentication numbers, and the like) used to hand over the products to the universal terminal 1 using mail or the like. At this time, as described above, there is a risk of the various numbers being acquired illegally by third parties or spread by viruses.

Accordingly, the authors of the present disclosure have created the present disclosure in view of the foregoing circumstances. An information processing system according to an embodiment of the present disclosure can unify biometric information which is used for biometric authentication by separating a device that performs the biometric authentication from a device that supplies a service. Thus, the information processing system according to the embodiment can supply a service even when a user does not register user information or perform a login manipulation for each store. Accordingly, since each store does not need to manage user information, the information processing system according to the embodiment can reduce a risk of the user information leaking. Further, the information processing system according to the embodiment has a function of granting recipient authority of a product so that a product can be handed over without using various numbers for receiving the product. Hereinafter, an overview of the information processing system according to the embodiment of the present disclosure, functional configurations of devices, operations of the devices, a hardware configuration, and the like will be described.

2. OVERVIEW OF INFORMATION PROCESSING SYSTEM

The background of the present disclosure has been described above. Next, an overview of the information processing system according to an embodiment of the present disclosure will be described with reference to FIG. 2.

(2-1. Overview of Information Processing System)

Figure 2:
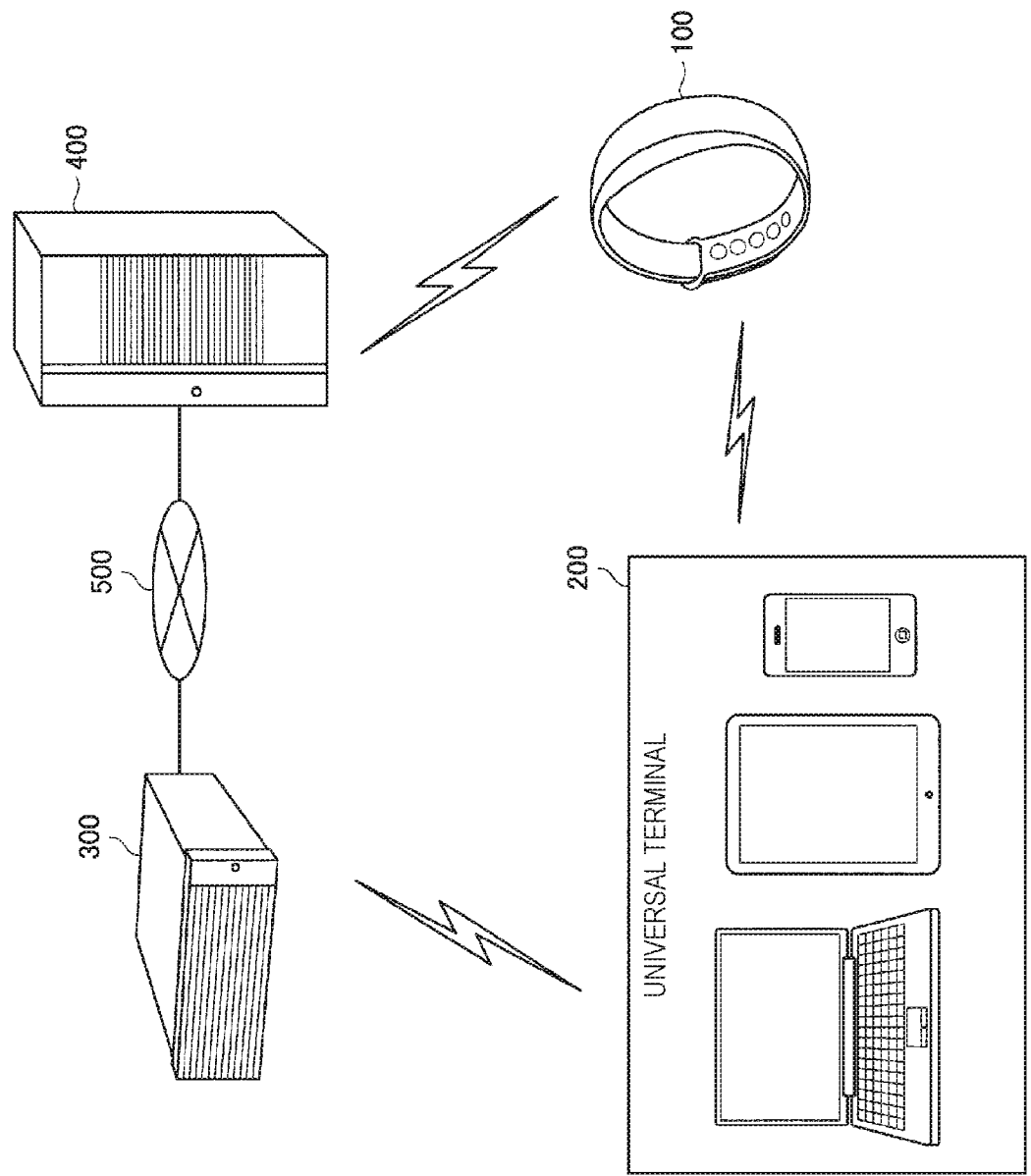
FIG. 2 is a diagram illustrating a configuration of an information processing system according to an embodiment.

FIG. 2 is a diagram illustrating a configuration of an information processing system according to an embodiment. As illustrated in FIG. 2, the information processing system according to the embodiment includes an authentication terminal 100, a universal terminal 200, a store server 300, and an account settlement server 400. As illustrated in FIG. 2, mutual wireless communication is performed between the authentication terminal 100 and the universal terminal 200, between the authentication terminal 100 and the account settlement server 400, and between the universal terminal 200 and the store server 300. In addition, the store server 300 and the account settlement server 400 are connected by a network 500. Here, the foregoing communication connection form is merely exemplary and any communication connection form of the devices can be used. In addition, in the present specification, an example in which the information processing system has the foregoing configuration is described, but the functions of the store server 300 and the account settlement server 400 may be integrated into one device or may be distributed among three or more devices.

The information processing system according to the embodiment can vary. For example, the information processing system according to the embodiment may be a system for a shopping service in which users can order products, a reservation service (hotel reservation, rental car reservation, or the like), a service for sharing economy (car sharing, private rental, or the like), or the like. Here, in the present specification, an example of a case in which the information processing system according to the embodiment is a shopping service system will be mainly described.

(2-2. Overview of Authentication Terminal 100)

The authentication terminal 100 according to the embodiment is an information processing terminal that performs biometric authentication (also referred to as a first device). More specifically, the authentication terminal 100 has a configuration for acquiring biometric information, and thus performs biometric authentication by comparing the acquired biometric information with biometric information registered in advance.

Any kind of authentication terminal 100 can be used. In the present specification, an example of a case in which the authentication terminal 100 is a bracelet type wearable terminal worn by a biometric authentication target user will be described. Here, since the authentication terminal 100 is a wearable terminal, security can be improved. More specifically, since the authentication terminal 100 is a wearable terminal, an authentication state can be changed from an authenticated state to an unauthenticated state when the user takes off the authentication terminal 100. Thus, it is possible to prevent the authentication terminal 100 from being abused when a third party illegally acquires the authentication terminal 100 after the authentication.

Note that, in the present specification, an example in which the biometric authentication is performed by the authentication terminal 100 will be described, but the biometric authentication may be performed by a terminal other than the authentication terminal 100. For example, the authentication terminal 100 may acquire biometric information and transmit the biometric information to the account settlement server 400, and the account settlement server 400 may perform the biometric authentication.

As described above, the case in which the authentication terminal 100 is a bracelet type wearable terminal is merely exemplary. The authentication terminal 100 may be a glasses type device, a watch type device, a ring type device, or a clothing type device, or may not be a wearable terminal.

In addition, in the present specification, an example in which fingerprint authentication is used as the biometric authentication will be mainly described, but any kind of biometric authentication can be used. For example, vein authentication, iris authentication, voiceprint authentication, face authentication, or the like may be used as the biometric authentication.

In addition, the authentication terminal 100 acquires identification information of the universal terminal 200 which is used for service use. For example, the authentication terminal 100 acquires connection request information including the identification information of the universal terminal 200 through wireless communication with the universal terminal 200 to perform a connection process using activation of a predetermined application of the universal terminal 200 as a trigger when the service use starts. Then, the authentication terminal 100 transmits the identification information of the authentication terminal 100 and the identification information of the universal terminal 200 to the account settlement server 400.

Thus, the account settlement server 400 supplying a service can store the authentication terminal 100 that performs fingerprint authentication in association with the universal terminal 200 which is a terminal of a service supply destination, and thus the user does not need to perform login in a case in which the user uses a service. More specifically, the information processing system according to the embodiment can determine that a process equivalent to the login is performed on the basis of the state in which the authentication terminal 100 performing the fingerprint authentication is stored in association with the universal terminal 200 in the account settlement server 400 after the success of the fingerprint authentication, and can allow the user to use the service using the universal terminal 200.

Note that the authentication terminal 100 may have a function other than the foregoing functions. For example, the authentication terminal 100 may have a settlement function (credit card settlement, prepaid settlement, or the like), a user behavior measurement function (the number of steps, a movement distance, calorie consumption measurement function, or the like), a watch function, a mail function, or the like.

(2-3. Overview of Universal Terminal 200)

The universal terminal 200 according to the embodiment is a terminal that is used when the user uses a service (also referred to as a second device). More specifically, the user can access the store server 300 using a predetermined application installed on the universal terminal 200 to use a service. For example, the user can order a product, change a recipient of the product, and the like using the universal terminal 200. Note that any kind of universal terminal 200 can be used. For example, the universal terminal 200 may be any device such as a notebook type PC, a tablet PC, a smartphone, a portable game terminal, or a digital camera as long as the device has a communication function.

(2-4. Overview of Store Server 300)

The store server 300 according to the embodiment is a device that is installed in a store or the like and performs a process related to an order or the like of a product, a process related to a change in a recipient, and the like. More specifically, with regard to the process related to an order or the like of a product, in a case in which the user orders a product using the universal terminal 200, the store server 300 receives order information from the universal terminal 200 and transmits the order information to the account settlement server 400. After the account settlement server 400 performs a process, the store server 300 notifies the user that information regarding order success or failure is transmitted to the universal terminal 200.

Next, the process related to the change in a recipient will be described more specifically. When the user orders a product, the store server 300 acquires family information of the user from the account settlement server 400 and checks whether the recipient is changed in a case in which family members are registered. In a case in which the recipient is changed by the user, the store server 300 transmits information regarding the change in the recipient (information regarding whether to change a recipient, identification information of a user set as a recipient, or the like) to the account settlement server 400. Thus, the account settlement server 400 can ascertain the user designated as the recipient and supply the recipient authority information to the authentication terminal 100 of the user.

In addition, in a case in which the recipient visits the store and brings the authentication terminal 100 close to or in contact with a predetermined device, the store server 300 acquires the recipient authority information (product identification information, a purchase date, a purchaser attribute, a recipient attribute, identification information of the authentication terminal 100, or the like) from the authentication terminal 100 via the predetermined device. Thereafter, the store server 300 transmits the recipient authority information to the account settlement server 400, and the account settlement server 400 determines whether or not the user is a recipient set in advance. Thus, the user can perform verification of the recipient without using various numbers (enquiry numbers, authentication numbers, and the like). That is, it is possible to reduce the risk of the various numbers being acquired illegally by third parties or spread by viruses.

(2-5. Overview of Account Settlement Server 400)

The account settlement server 400 according to the embodiment is an information processing device that performs management of various kinds of information, a process related to an order or the like of a product, a process related to a change in a recipient, a process related to issuing of a coupon, and the like. The management of various kinds of information will be described specifically. The account settlement server 400 manages user attribute information (names, ages, contact information, addresses, and the like), credit card information (card number information, history information, and the like), family information (family structures, family attribute information, identification information of the authentication terminals 100 of family, and the like), friend information (friend attribute information, identification information of the authentication terminals 100 of friends, and the like), behavior history information, purchase history information, and the like. In addition, as described above, the account settlement server 400 manages the identification information of the authentication terminal 100 received from the authentication terminal 100 in association with the identification information of the universal terminal 200. Further, the account settlement server 400 manages information regarding an authentication state received from the authentication terminal 100.

In the information processing system according to the embodiment, each store server 300 does not separately manage various kinds of information including user information, but the account settlement server 400 unifies and manages the information. Thus, the information processing system according to the embodiment can reduce a risk of leakage of the user information or the like.

In addition, the process related to an order or the like of a product will be described more specifically. In a case in which a user orders a product, the account settlement server 400 receives order information (a product, a price, an order date, identification information of the universal terminal 200 performing the order, and the like) from the store server 300. Then, the account settlement server 400 searches for an identification number matching the identification information of the universal terminal 200 performing the order among the identification information of the universal terminal 200 managed in association with the authentication terminal 100 succeeding in fingerprint authentication.

In a case in which there is an identification number matching the identification information of the universal terminal 200 performing the order, the account settlement server 400 transmits an approval request to the authentication terminal 100 associated with the identification information. Thus, the account settlement server 400 requests the user to approve the order. In a case in which the user approves the order, the account settlement server 400 confirms the order and performs a settlement process or the like. In a case in which the user does not approve the order, the account settlement server 400 does not receive the order. Thus, the account settlement server 400 can prevent an illegal order by a third party from being confirmed. More specifically, even when the third party illegally acquires the universal terminal 200 and performs an order after success of the fingerprint authentication, the order can be prevented from being confirmed when the user does not approve the order using the authentication terminal 100.

Note that, in a case in which the authentication terminal 100 and the universal terminal 200 are separated by a predetermined distance, the account settlement server 400 may take countermeasures against an illegal order by a third party by performing control such as non-reception of an order from the universal terminal 200. Thus, the account settlement server 400 can take countermeasures against an illegal order even when the user does not perform a non-approving manipulation.

Next, the process related to the change in a recipient will be described specifically. When the user orders a product using the universal terminal 200, the account settlement server 400 transmits family information of the user to the store server 300. Thus, the store server 300 can confirm whether or not the user changes the recipient. In a case in which the recipient is changed, the account settlement server 400 receives recipient change information from the store server 300 and transmits recipient authority information to the authentication terminal 100 of the user designated as the recipient. Thus, the recipient authority information is stored in the authentication terminal 100 of the recipient. Then, when the user designated as the recipient visits a store and receives the product, the account settlement server 400 determines whether or not the user is the recipient set in advance on the basis of the recipient authority information acquired from the authentication terminal 100 of the user visiting the store and transmits determination result information to the store server 300. Thus, the information processing system according to the embodiment can appropriately perform the change in the recipient without an error.

Next, the process related to the issuing of a coupon will be described specifically. The account settlement server 400 acquires information regarding the user visiting the store and his or her companion. For example, it is assumed that a beacon terminal is installed in the store and the beacon terminal periodically sends a beacon. Then, in a case in which the authentication terminals 100 of the user visiting the store and his or her companion receive the beacon, the authentication terminals 100 transmit beacon reception information (identification information of the beacon terminal, a reception radio wave intensity, a reception time, or the like) to the account settlement server 400. Then, the account settlement server 400 can ascertain that the user visits the store along with his or her family or friend on the basis of the beacon reception information and family information or friend information managed by the own device.

Thereafter, for example, in a case in which the user purchases a product in the store, the account settlement server 400 acquires the information and issues coupons to the authentication terminals 100 of the user purchasing the product and his or her companion. The account settlement server 400 can prevent a person other than an issuing target from using the coupons by issuing the coupons to the authentication terminals 100. More specifically, the authentication terminal 100 can authenticate the own user when the authentication terminal 100 is worn by the user. Therefore, the account settlement server 400 can prevent a third party from using the coupon of the authentication terminal 100 without authentication. Note that a coupon can be issued under any conditions. For example, even in a case in which the user does not visit the store to purchase a product but purchases the product using the universal terminal 200 from any place, the account settlement server 400 may issue the coupon. In addition, a coupon issuing target may be any target. For example, the account settlement server 400 may issue a coupon to the universal terminal 200 rather than the authentication terminal 100. In addition, the account settlement server 400 may issue a coupon to only a user purchasing a product without issuing a coupon to his or her companion.

3. FUNCTIONAL CONFIGURATION OF DEVICE

The overview of the information processing system according to the embodiment has been described above. Next, a functional configuration of each device according to the embodiment will be described with reference to FIGS. 3 to 6.

(3-1. Functional Configuration of Authentication Terminal 100)

Figure 3:
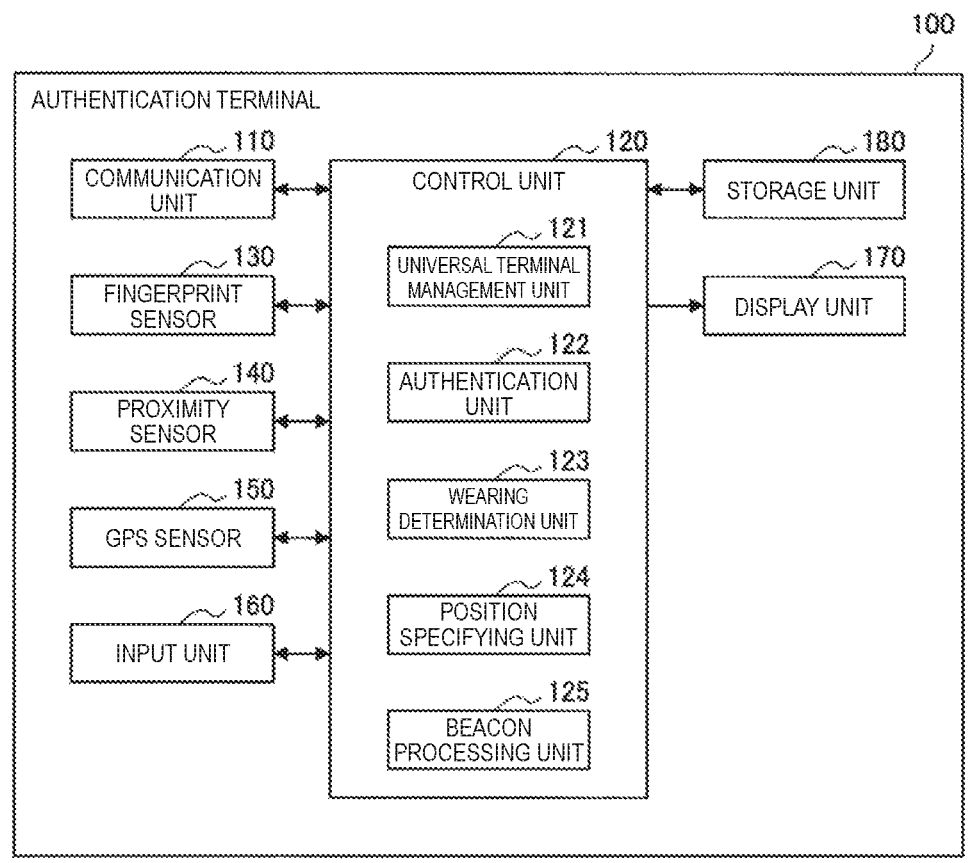
FIG. 3 is a diagram illustrating a functional configuration of an authentication terminal according to the embodiment.

First, a function of the authentication terminal 100 will be described with reference to FIG. 3. FIG. 3 is a diagram illustrating a functional configuration of the authentication terminal 100 according to the embodiment. As illustrated in FIG. 3, the authentication terminal 100 according to the embodiment includes a communication unit 110, a control unit 120, a fingerprint sensor 130, a proximity sensor 140, a global positioning system (GPS) sensor 150, an input unit 160, a display unit 170, and a storage unit 180. In addition, the control unit 120 includes a universal terminal management unit 121, an authentication unit 122, a wearing determination unit 123, a position specifying unit 124, and a beacon processing unit 125. The communication unit 110 also functions as a transmission unit and the control unit 120 also functions as an acquisition unit.

(Communication Unit 110)

The communication unit 110 communicates with the universal terminal 200 and the account settlement server 400. Communication with the universal terminal 200 will be described specifically. When the connection request information is received from the universal terminal 200, the communication unit 110 supplies the connection request information to the control unit 120. After a connection process by the control unit 120 is completed, the communication unit 110 transmits connection completion information to the universal terminal 200.

In addition, communication with the account settlement server 400 will be described specifically. In a case in which fingerprint authentication succeeds and a connection process between the own device and the universal terminal 200 is completed, the communication unit 110 transmits the identification information of the universal terminal 200 and the own device to the account settlement server 400.

Thereafter, in a case in which the user orders a product using the universal terminal 200, the communication unit 110 receives an approval request for the order from the account settlement server 400. Then, after the user approves or denies, the communication unit 110 transmits such approval result information to the account settlement server 400. In addition, in addition to the forgoing process, for example, the communication unit 110 performs communication related to a change in the recipient, issuing of a coupon, or the like with the account settlement server 400. In addition, the communication unit 110 can also receive a beacon transmitted from the beacon terminal.

(Control Unit 120)

The control unit 120 controls various processes of the authentication terminal 100. Hereinafter, functions of the universal terminal management unit 121, the authentication unit 122, the wearing determination unit 123, and the position specifying unit 124 included in the control unit 120 will be described. Note that the functions of the control unit 120 are not limited to functions to be described below. For example, the control unit 120 may control a user behavior measurement function (the number of steps, a movement distance, calorie consumption measurement function, or the like), a watch function, a mail function, or the like.

(Universal Terminal Management Unit 121)

The universal terminal management unit 121 manages information regarding the universal terminal 200. More specifically, in a case in which connection request information including the identification information of the universal terminal 200 transmitted by the universal terminal 200 is acquired, the universal terminal management unit 121 manages the identification information of the universal terminal 200. Note that the universal terminal management unit 121 may manage the plurality of universal terminals 200. That is, in a case in which the user uses the plurality of universal terminals 200 together, the universal terminal management unit 121 may manage the identification information of the plurality of universal terminals 200.

(Authentication Unit 122)

The authentication unit 122 performs fingerprint authentication. More specifically, when the user wears the authentication terminal 100, the fingerprint sensor 130 acquires fingerprint information of the user and supplies the fingerprint information to the authentication unit 122. Then, the authentication unit 122 performs pattern matching using the acquired fingerprint information and fingerprint information of the user registered in advance. In a case in which similarity calculated through the pattern matching in the authentication unit 122 is higher than a predetermined value, the authentication unit 122 determines that the fingerprint authentication succeeds. Note that at any timing, the fingerprint information is acquired by the fingerprint sensor 130. In addition, any fingerprint authentication scheme can be used. For example, the authentication unit 122 may perform the fingerprint authentication process using a feature point extraction scheme or a frequency analysis scheme other than the pattern matching scheme.

The authentication unit 122 controls a process of transmitting information regarding whether the fingerprint authentication succeeds to the account settlement server 400. Note that the authentication unit 122 may notify the user whether the fingerprint authentication succeeds by light, sound, or the like by controlling a light emission unit (not illustrated), a sounding unit (not illustrated), or the like.

(Wearing Determination Unit 123)

The wearing determination unit 123 determines a wearing state of the authentication terminal 100 by the user. More specifically, the wearing determination unit 123 acquires information regarding separation distances between the user and the authentication terminal 100 from the proximity sensor 140 and determines whether or not the user wears the authentication terminal 100, or whether or not the user attempts to wear the authentication terminal 100 on the basis of the information. Thus, when the user wears the authentication terminal 100, the fingerprint sensor 130 can acquire the fingerprint information. In addition, in a case in which the wearing determination unit 123 determines that the user does not wear the authentication terminal 100, the wearing determination unit 123 performs a process of notifying the account settlement server 400 that the user does not wear the authentication terminal 100. Thus, the account settlement server 400 can change an authentication state from an authenticated state to an unauthenticated state.

(Position Specifying Unit 124)

The position specifying unit 124 specifies the position of the authentication terminal 100. More specifically, the position specifying unit 124 acquires information regarding a GPS signal from the GPS sensor 150 and specifies the position on the basis of the information. The position specifying unit 124 performs a process of notifying the account settlement server 400 of the specified positional information. Thus, the account settlement server 400 can specify a route along which the user moves, determine whether or not the user visits a store, or the like.

(Beacon Processing Unit 125)

The beacon processing unit 125 performs a process related to a beacon. More specifically, in a case in which the communication unit 110 receives a beacon transmitted from the beacon terminal, the beacon processing unit 125 controls a process of transmitting beacon reception information (the identification information of the beacon terminal, the reception radio wave intensity, the reception time, or the like) to the account settlement server 400. Thus, the account settlement server 400 can ascertain a positional relation between the authentication terminal 100 and the beacon terminal. Accordingly, in a case in which the beacon terminal is installed in the store, the account settlement server 400 can estimate whether or not the user wearing the authentication terminal 100 visits the store on the basis of the beacon reception information.

Note that in the present specification, an example in which a beacon is used will be mainly described, but a positional relation between the authentication terminal 100 and a signal transmission device may be ascertained using a signal other than a beacon. For example, Bluetooth (registered trademark) or any signal such as infrared light or a sound wave may be used. In addition, in a case in which no beacon terminal is installed in a store or the like, the beacon processing unit 125 may perform a beacon transmission process. Thus, a positional relation between the authentication terminals 100 may be ascertained by transmitting and receiving a beacon between the authentication terminals 100.

(Fingerprint Sensor 130)

The fingerprint sensor 130 acquires fingerprint information of the user wearing the authentication terminal 100. More specifically, when the user wears the authentication terminal 100 and a finger of the user touches the fingerprint sensor 130, the fingerprint sensor 130 acquires fingerprint information of the user. The fingerprint sensor 130 supplies the acquired fingerprint information to the authentication unit 122. Here, when the fingerprint sensor 130 is located at a location which a finger of the user easily touches in a wearing operation of the authentication terminal 100, a sensation of performing preparation work for fingerprint authentication can be caused to be excluded from the consciousness of the user. Note that, at any timing, the fingerprint information can be acquired by the fingerprint sensor 130. In addition, any kind of the fingerprint sensor 130 can be used. For example, the fingerprint sensor 130 may be an optical type, electrostatic capacitance type, electrolytic strength measurement type, pressure-sensitive type, or thermal-sensitive sensor or the like.

(Proximity Sensor 140)

The proximity sensor 140 acquires information regarding a separation distance between the user and the authentication terminal 100. More specifically, the proximity sensor 140 radiates electromagnetic waves or the like and acquires the information regarding the separation distance between the user and the authentication terminal 100 on the basis of a change in electromagnetic waves or the like generated when the user grasps or wears the authentication terminal 100. The proximity sensor 140 supplies the acquired information regarding the separation distance to the wearing determination unit 123. Thus, the wearing determination unit 123 can determine whether or not the user wears the authentication terminal 100, or whether or not the user attempts to wear the authentication terminal 100. Note that any kind of proximity sensor 140 can be used. For example, the proximity sensor 140 may be an induction type, electrostatic capacitance type, ultrasonic wave type, or infrared type sensor.

(GPS Sensor 150)

The GPS sensor 150 acquires GPS signal information for specifying the position of the authentication terminal 100. More specifically, the GPS sensor 150 receives GPS signals from GPS satellites and supplies the GPS signal information to the position specifying unit 124. Thus, the position specifying unit 124 can determine the position of the authentication terminal 100.

(Input Unit 160)

The input unit 160 acquires input information by the user. More specifically, the input unit 160 can include a button, a touch panel, or the like. When the user manipulates the button, the touch panel, or the like, the input unit 160 generates input information on the basis of the manipulation and supplies the input information to the control unit 120. Thus, the control unit 120 can perform various processes.

(Display Unit 170)

The display unit 170 displays various kinds of information. More specifically, the control unit 120 performs control such that the display unit 170 visually notifies the user of the information by displaying various kinds of information in various formats such as images, text, or graphs. The various kinds of information can include various kinds of content.

(Storage Unit 180)

The storage unit 180 stores various kinds of information. More specifically, the storage unit 180 stores the identification information of the own device and the universal terminal 200, the fingerprint information, the GPS signal information, the positional information, the information regarding the separation distance between the user and the authentication terminal 100, the input information, and the like described above.

(3-2. Functional Configuration of Universal Terminal 200)

Figure 4:
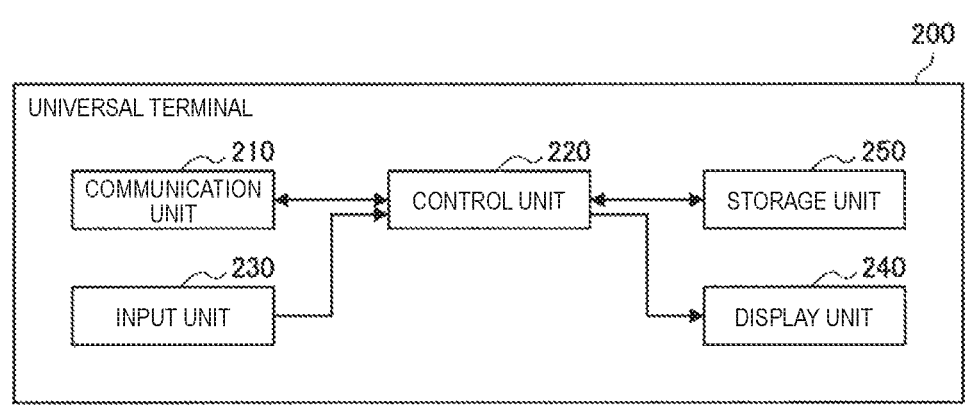
FIG. 4 is a diagram illustrating a functional configuration of a universal terminal according to the embodiment.

Next, a function of the universal terminal 200 will be described with reference to FIG. 4. FIG. 4 is a diagram illustrating a functional configuration of the universal terminal 200 according to the embodiment. As illustrated in FIG. 4, the universal terminal 200 according to the embodiment includes a communication unit 210, a control unit 220, an input unit 230, a display unit 240, and a storage unit 250.

(Communication unit 210)

The communication unit 210 communicates with the authentication terminal 100 and the store server 300. Communication with the authentication terminal 100 will be described specifically. The communication unit 210 transmits connection request information to the authentication terminal 100, using activation of a predetermined application of the own device through a user manipulation as a trigger. Then, after a connection process between the authentication terminal 100 and the own device is completed, the communication unit 210 receives connection completion information from the authentication terminal 100. Here, in a case in which the connection completion information may not be received from the authentication terminal 100, the communication unit 210 may transmit the connection request information a predetermined number of times or may transmit the connection request information until the connection completion information is received. Note that any trigger used for the communication unit 210 to transmit the connection request information can be used.

Communication with the store server 300 will be described specifically. When the user orders a product or the like, the communication unit 210 transmits order information (a product, a price, an order date, the identification information of the universal terminal 200 performing ordering, and the like) to the store server 300. Thereafter, the communication unit 210 receives order success or failure information regarding whether or not the order succeeds from the store server 300. In addition, the communication unit 110 communicates, for example, various kinds of information or the like accompanied by a change in a recipient with the store server 300 in addition to the foregoing information.

(Control Unit 220)

The control unit 220 controls various processes of the universal terminal 200. Hereinafter, a process related to the order of a product and a process related to the change in the recipient will be described specifically. First, the process related to the order of a product will be described specifically. The control unit 220 controls a predetermined application that performs access to the store server 300. In addition, the control unit 220 controls a process of transmitting connection request information to the authentication terminal 100 to make connection between the own device and the authentication terminal 100. In addition, in a case in which the user orders a product, a process of transmitting order information to the store server 300 is controlled.

The process related to the change in a recipient will be described specifically. The control unit 220 controls a process of causing the user to check whether or not the recipient is changed after the user performs the manipulation of ordering the product. In a case in which the recipient is changed, the control unit 220 controls the process of transmitting information regarding the change in the recipient to the store server 300.

(Input Unit 230)

The input unit 230 acquires input information by the user as in the input unit 160 of the authentication terminal 100. The input unit 230 generates the input information and supplies the input information to the control unit 220. Thus, the control unit 220 can perform various processes.

(Display Unit 240)

The display unit 240 displays various kinds of information as in the input unit 160 of the authentication terminal 100.

(Storage Unit 250)

The storage unit 250 stores various kinds of information. More specifically, the storage unit 250 stores the order information, the order success or failure information, the input information, and the like described above.

(3-3. Functional Configuration of Store Server 300)

Figure 5:
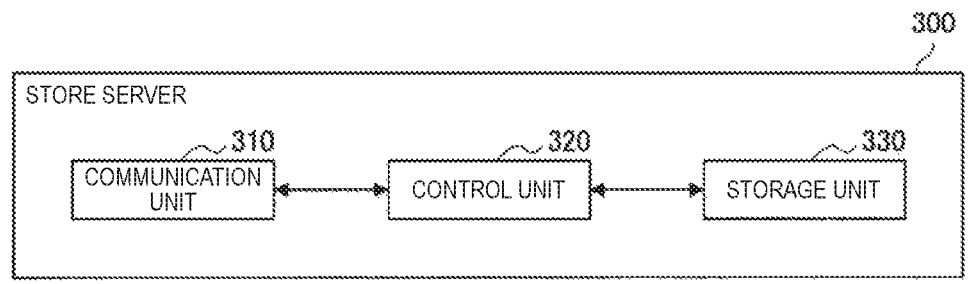
FIG. 5 is a diagram illustrating a functional configuration of a store server according to the embodiment.

Next, a function of the store server 300 will be described with reference to FIG. 5. FIG. 5 is a diagram illustrating a functional configuration of the store server 300 according to the embodiment. As illustrated in FIG. 5, the store server 300 according to the embodiment includes a communication unit 310, a control unit 320, and a storage unit 330.

(Communication Unit 310)

The communication unit 310 communicates with the universal terminal 200 and the account settlement server 400. Communication with the universal terminal 200 will be described specifically. The communication unit 310 communicates the order information and the order success or failure information accompanied by the order of the product with the universal terminal 200. In addition, the communication unit 310 communicates the information regarding the change in the recipient or the like accompanied by the change in the recipient with the universal terminal 200.

Communication with the account settlement server 400 will be described specifically. The communication unit 310 communicates the order information and approval result information or the like of the user about the order accompanied by the order of the product with the account settlement server 400. In addition, the communication unit 310 communicates the recipient change information or the like accompanied by the change in the recipient with the account settlement server 400.

(Control Unit 320)

The control unit 320 controls various processes of the store server 300. Hereinafter, the process related to the order of the product and the process related to the change in the recipient will be described specifically. First, the process related to the order of the product will be described specifically. In a case in which the user orders the product, the control unit 320 controls a process of transmitting the order information to the account settlement server 400. In addition, when the order success or failure information from the account settlement server 400 is acquired, the control unit 320 controls a process of transmitting the information to the universal terminal 200.

The process related to the change in the recipient will be described specifically. When the user performs a manipulation of ordering the product, the control unit 320 acquires family information from the account settlement server 400 and controls the process of transmitting the information to the universal terminal 200. When the recipient change information is acquired from the universal terminal 200, a process of transmitting the information to the account settlement server 400 is controlled.

(Storage Unit 330)

The storage unit 330 stores various kinds of information. More specifically, the storage unit 330 stores the order information, the order success or failure information, the recipient change information, the approval result information, and the like described above.

(3-4. Functional Configuration of Account Settlement Server 400)

Figure 6:
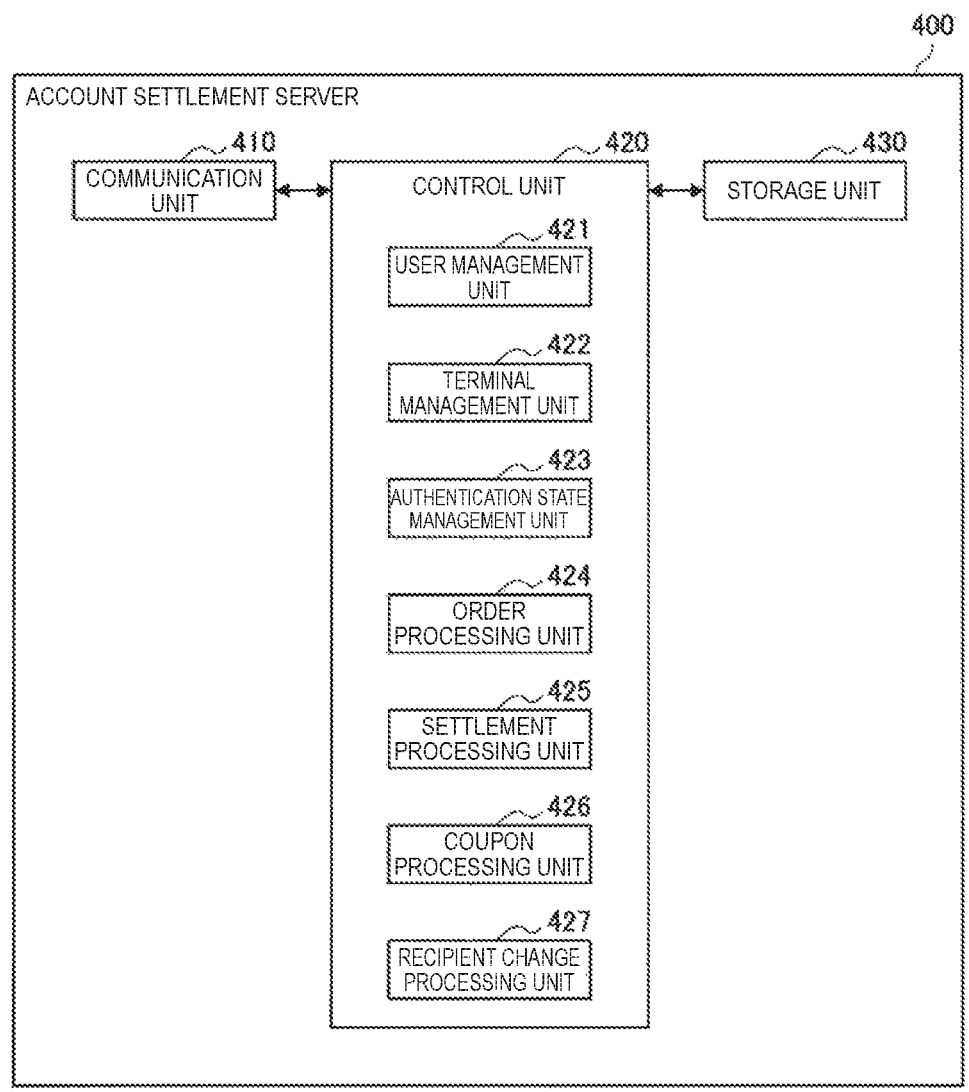
FIG. 6 is a diagram illustrating a functional configuration of an account settlement server according to the embodiment.

Next, a function of the account settlement server 400 will be described with reference to FIG. 6. FIG. 6 is a diagram illustrating a functional configuration of the account settlement server 400 according to the embodiment. As illustrated in FIG. 6, the account settlement server 400 according to the embodiment includes a communication unit 410, a control unit 420, and a storage unit 430. In addition, the control unit 420 includes a user management unit 421, a terminal management unit 422, an authentication state management unit 423, an order processing unit 424, a settlement processing unit 425, a coupon processing unit 426, and a recipient change processing unit 427. The control unit 420 also functions an acquisition unit and a service supply unit.

(Communication Unit 410)

The communication unit 410 communicates with the authentication terminal 100 and the store server 300. Communication with the authentication terminal 100 will be described specifically. After the fingerprint authentication succeeds and connection between the authentication terminal 100 and the universal terminal 200 is completed, the communication unit 410 receives the identification information of the authentication terminal 100 and the universal terminal 200 from the authentication terminal 100. In addition, in a case in which the user orders a product using the universal terminal 200, the communication unit 410 transmits an approval request for the order to the authentication terminal 100. Then, in a case in which the user approves or denies, the communication unit 410 receives an approval result from the authentication terminal 100. In addition, the communication unit 410 transmits, for example, the recipient authority information and coupon information to the authentication terminal 100 in addition to the foregoing approval result.

Communication with the store server 300 will be described specifically. The communication unit 410 communicates the order information, the order success or failure information, and the like accompanied by the order of the product with the store server 300. In addition, the communication unit 410 communicates the family information, the recipient change information, and the like accompanied by the change in the recipient with the store server 300.

(Control unit 420)

The control unit 420 controls various processes of the account settlement server 400. Hereinafter, functions of the user management unit 421, the terminal management unit 422, the authentication state management unit 423, the order processing unit 424, the settlement processing unit 425, the coupon processing unit 426, and the recipient change processing unit 427 included in the control unit 420 will be described. Note that the functions of the control unit 420 are not limited to functions to be described below.

(User Management Unit 421)

The user management unit 421 manages various kinds of information. More specifically, the user management unit 421 manages user attribute information (names, ages, contact information, addresses, and the like), credit card information (card number information, history information, and the like), family information (family structures, family attribute information, identification information of the authentication terminals 100 of family, and the like), friend information (friend attribute information, identification information of the authentication terminals 100 of friends, and the like), behavior history information, purchase history information, and the like. Note that the foregoing behavior history information includes positional information of the user. The user management unit 421 acquires the positional information of the user specified on the basis of the GPS signals from the authentication terminal 100 and manages the positional information.

In addition, the user management unit 421 acquires the beacon reception information from the authentication terminal 100, predicts a positional relation between the beacon terminal and the authentication terminal 100 on the basis of the information, and manages the positional relation as positional relation information. In addition, the user management unit 421 predicts the positional relation between the plurality of authentication terminals 100 on the basis of the beacon reception information transmitted from the plurality of authentication terminals 100 and manages the positional relation as positional relation information.

(Terminal Management Unit 422)

The terminal management unit 422 manages information regarding the authentication terminal 100 and the universal terminal 200. More specifically, the terminal management unit 422 manages the identification information of the authentication terminal 100 transmitted from the authentication terminal 100 after the success of the fingerprint authentication in association with the identification information of the universal terminal 200. In addition, the terminal management unit 422 may manage the identification information of the authentication terminal 100 in association with the identification information of the plurality of universal terminals 200. That is, in a case in which the user uses the plurality of universal terminals 200 together, the terminal management unit 422 may manage the identification information of the plurality of universal terminals 200 in association with the identification information of the authentication terminal 100.

(Authentication State Management Unit 423)

The authentication state management unit 423 manages an authentication state of the user by the authentication terminal 100. More specifically, the authentication state management unit 423 manages the authentication state of the user on the basis of information regarding whether or not the fingerprint authentication succeeds transmitted by the authentication terminal 100. In addition, in a case in which information indicating that the user does not wear the authentication terminal 100 is acquired, the authentication state management unit 423 changes the authentication state from the authentication state to the unauthenticated state.

(Order Processing Unit 424)

The order processing unit 424 performs a process related to the order of a product or the like by the user. More specifically, in a case which the user orders a product or the like using the universal terminal 200, the order processing unit 424 acquires order information (a product, a price, an order date, the identification information of the universal terminal 200 performing the order, and the like) from the store server 300. Thereafter, the order processing unit 424 performs a process of transmitting an approval request to the authentication terminal 100 to obtain the approval request for the order from the user. Then, the order processing unit 424 performs confirming of the order or the like on the basis of an approval result transmitted from the authentication terminal 100. Then, the order processing unit 424 controls a process of generating order success or failure information and transmitting the information to the universal terminal 200.

(Settlement Processing Unit 425)

The settlement processing unit 425 performs a settlement process for an order or the like. More specifically, in a case in which the user approves of the order of a product, the settlement processing unit 425 performs a credit card settlement process. Note that the settlement processing unit 425 may perform a prepaid settlement process.

(Coupon Processing Unit 426)

The coupon processing unit 426 performs a process related to issuing of a coupon. More specifically, the coupon processing unit 426 issues a coupon to a user who has paid for a certain product or service or a user who has done a certain behavior with reference to purchase history information of the user. In addition, the coupon processing unit 426 issues a coupon on the basis of a positional relation between the plurality of authentication terminals 100. For example, the coupon processing unit 426 acquires the positional relation information, the family information, and the friend information managed by the user management unit 421 and determines whether or not there is a companion of the user purchasing a product in the store on the basis of the information. Then, in a case in which there is the companion of the user purchasing the product, the coupon processing unit 426 issues coupons to the user purchasing the product and the companion.

In addition, the coupon processing unit 426 may expect a future behavior and issue a coupon by learning a behavior pattern of a user on the basis of the behavior history information of the user during a given period. For example, in a case in which the user purchases a product of a certain store periodically, the coupon processing unit 426 may expect the user to do a similar behavior in the future and issue a coupon related to the product of the store. In addition, the coupon processing unit 426 may recommend a store to a user on the basis of the behavior history information of the user and issue a coupon related to the store. For example, in a case in which a user has eaten lunch in a restaurant, the coupon processing unit 426 performs a process of transmitting information regarding recommendation of nearby dessert stores to the authentication terminal 100. In a case in which the user has done a behavior for making reservation of a dessert store, the coupon processing unit 426 may issue a coupon related to the dessert store.

The coupon processing unit 426 generates a signal including coupon information (a discount amount, a validity period, and the like) and performs a process of transmitting the signal to the authentication terminal 100 of a target user. Note that a transmission destination of the coupon information may be the universal terminal 200 rather than the authentication terminal 100 of the target user.

(Recipient Change Processing Unit 427)

The recipient change processing unit 427 performs a process of changing a recipient of a product. More specifically, when the recipient change information transmitted from the store server 300 is acquired, the recipient change processing unit 427 performs a process of transmitting the recipient authority information to the authentication terminal 100 of the recipient. Thus, the recipient can prove that he or she is the recipient by bringing the authentication terminal 100 close to or in contact with a predetermined device of a store, or the like. Note that a transmission destination of the recipient authority information may be the universal terminal 200 rather than the authentication terminal 100.

In addition, when a product is received, the recipient change processing unit 427 determines whether or not the user is a recipient set in advance on the basis of the recipient authority information acquired from the authentication terminal 100 of the user visiting the store and controls a process of transmitting determination result information to the store server 300.

(Storage Unit 430)

The storage unit 430 stores various kinds of information. More specifically, the storage unit 430 stores the user attribute information, the credit card information, the family information, the friend information, the behavior history information, the purchase history information, the positional relation information, the identification information of the authentication terminal 100 and the universal terminal 200, the information regarding whether or not the fingerprint authentication succeeds, the recipient change information, the recipient authority information, the coupon information, the order information, the order success or failure information, the determination result information, and the like described above.

4. OPERATION OF DEVICE

The functional configuration of each device according to the embodiment has been described above. Next, an operation of each device according to the embodiment will be described with reference to FIGS. 7 to 10.

(4-1. Fingerprint Authentication Operation)

First, an authentication operation by the authentication terminal 100 will be described with reference to FIG. 7. FIG. 7 is a flowchart illustrating an authentication operation by the authentication terminal 100.

In step S1000, the wearing determination unit 123 of the authentication terminal 100 determines a wearing state of the own device by the user. In a case in which the wearing determination unit 123 determines that the user is performing an operation of wearing the own device (Yes in step S1004), the fingerprint sensor 130 acquires fingerprint information of the user in step S1008 and the authentication unit 122 performs the fingerprint authentication using the fingerprint information in step S1012.

In a case in which the fingerprint authentication succeeds (Yes in step S1016), the authentication unit 122 notifies the account settlement server 400 in step S1020 that the authentication succeeds, and then the process ends. In a case in which the fingerprint authentication does not succeed (No in step S1016), the authentication unit 122 notifies the account settlement server 400 in step S1024 that the authentication fails, and then the process ends.

In a case in which the wearing determination unit 123 determines in step S1004 that the user is not performing the operation of wearing the own device (No in step S1004) and a case in which the wearing determination unit 123 determines that the user does not wear the own device (Yes in step S1028), the wearing determination unit 123 notifies the account settlement server 400 in step S1032 that the user does not wear the own device, and then the process ends. In a case in which the wearing determination unit 123 determines in step S1028 that the user wears the own device (No in step S1028), the process ends. Note that the authentication terminal 100 is assumed to perform the operation of the flowchart of FIG. 7 periodically, perform the operation at a predetermined timing, or perform the operation on the basis of any trigger.

(4-2. Operation of Ordering Product)

Next, an operation of ordering a product will be described with reference to FIG. 8. FIG. 8 is a sequence diagram illustrating an operation in a case in which a product is ordered using the information processing system according to the embodiment. Note that the sequence diagram of FIG.

8 is assumed to be performed in a state in which the fingerprint authentication illustrated in FIG. 7 succeeds.

First, in step S1100, the user activates a predetermined application of the universal terminal 200. In step S1104, the communication unit 210 of the universal terminal 200 transmits connection request information including the identification information of the universal terminal 200 to the authentication terminal 100. In step S1108, the universal terminal management unit 121 of the authentication terminal 100 connects the authentication terminal 100 to the universal terminal 200 on the basis of the acquisition of the identification information of the universal terminal 200. In step S1112, the communication unit 110 transmits connection completion information to the universal terminal 200. In step S1116, the communication unit 110 transmits the identification information of the authentication terminal 100 and the universal terminal 200 to the account settlement server 400. In step S1120, the terminal management unit 422 of the account settlement server 400 manages the identification information of the authentication terminal 100 and the universal terminal 200 in association therewith.

When the user performs a manipulation of ordering a product using a predetermined application of the universal terminal 200 in step S1124, the communication unit 210 of the universal terminal 200 transmits order information to the store server 300 in step S1128. In step S1132, the control unit 320 of the store server 300 performs a process of registering the order information. In step S1136, the communication unit 310 transmits the order information to the account settlement server 400. In step S1140, the order processing unit 424 of the account settlement server 400 performs a process of registering the order information. In step S1144, the communication unit 410 transmits approval request information to the authentication terminal 100. In a case in which the user performs an approval manipulation using the authentication terminal 100 in step S1148, the communication unit 110 of the authentication terminal 100 transmits approval result information to the account settlement server 400 in step S1152.

In step S1156, the order processing unit 424 of the account settlement server 400 performs a process of confirming the order, or the like when approval result information transmitted from the authentication terminal 100 is acquired. In a case in which the user approves of the order, the settlement processing unit 425 performs the settlement process in step S1160. In step S1164, the communication unit 410 transmits the order success or failure information to the store server 300. In step S1168, the control unit 320 of the store server 300 performs a process of confirming the order, or the like. In step S1172, the communication unit 310 transmits the order success or failure information to the universal terminal 200. In step S1176, the display unit 240 of the universal terminal 200 notifies the user of success or failure of the order by displaying the order success or failure information, and then the process ends.

(4-3. Recipient Changing Operation)

Next, a recipient changing operation will be described with reference to FIG. 9. FIG. 9 is a sequence diagram illustrating an operation in a case in which a recipient of a product is changed using the information processing system according to the embodiment. More specifically, FIG. 9 illustrates an operation of changing a recipient of a product after an order of the product is completed by the operation of FIG. 8. Note that, hereinafter, a case in which the user orders a product using the universal terminal 200 and then continuously changes a recipient will be assumed for description, but any timing at which the recipient is changed and any device can be used. For example, the user may order a product and then change a recipient again. In addition, the user may change a recipient using the authentication terminal 100 rather than the universal terminal 200.

First, in step S1200, the communication unit 310 of the store server 300 transmits information for requesting the family information of the user to the account settlement server 400. In step S1204, the user management unit 421 of the account settlement server 400 acquires the family information of the user. In step S1208, the communication unit 410 transmits the family information to the store server 300. Note that in a case in which the family information of the user is not registered, the communication unit 410 transmits information indicating that the family information is not registered. In a case in which the family information of the user is registered, the communication unit 310 of the store server 300 checks whether or not the recipient is changed by supplying the family information to the universal terminal 200 via a predetermined application in step S1212. In a case in which the recipient of the product is changed, the user performs a manipulation of changing the recipient using the application in step S1216. For example, the user selects a user desired to be designated as a recipient from a family list displayed on the basis of the family information. Thereafter, in step S1220, the recipient change information is supplied to the store server 300 via the application.

In step S1224, the communication unit 310 of the store server 300 transmits the recipient change information to the account settlement server 400. In step S1228, the recipient change processing unit 427 of the account settlement server 400 registers the recipient change information. In step S1232, the recipient change processing unit 427 transmits the recipient authority information to the authentication terminal 100 of the user set as the recipient. In step S1236, the control unit 120 of the authentication terminal 100 of the user set as the recipient acquires the recipient authority information, and then the process ends.

Note that, in step S1236, the fact that the recipient authority information is transmitted to the authentication terminal 100 of the user set as the recipient has been described. However, as described above, the recipient authority information may be transmitted to the universal terminal 200.

(4-4. Coupon Issuing Operation)

Next, a coupon issuing operation will be described with reference to FIG. 10. FIG. 10 is a sequence diagram illustrating an operation in a case in which a coupon is issued using the information processing system according to the embodiment. FIG. 10 is an explanatory diagram illustrating an operation of issuing coupons to users A and B in a case in which the user A visits a store along with the user B who is his or her family member or friend and purchases a product in the store. Note that a beacon terminal that transmits a beacon is installed in the store.

First, in step S1300, the communication unit 110 of an authentication terminal 100A of the user A receives a beacon transmitted by the beacon terminal. In step S1304, the communication unit 110 of the authentication terminal 100A transmits beacon reception information to the account settlement server 400. In step S1308 and step S1312, the communication unit 110 of an authentication terminal 100B receives a beacon and transmits beacon reception information to the account settlement server 400 as in the authentication terminal 100A.

In step S1316, the user management unit 421 of the account settlement server 400 calculates a positional relation between the authentication terminals 100A and 100B. In step S1320, the user management unit 421 acquires family information and friend information of the users A and B. Then, in step S1324, the user management unit 421 checks whether or not the users A and B are mutually registered as a family member or a friend. In a case in which the users A and B are mutually registered as the family member or the friend, information indicating that both the users A and B visit the store is registered.

Thereafter, in step S1328, the user A or B is assumed to purchase a product in the store. Here, any settlement method accompanied by the purchase can be used. For example, the user A or B may perform settlement by bringing the authentication terminal 100 or the universal terminal 200 close or in contact with a predetermined device installed in the store.

In step S1332, the coupon processing unit 426 of the account settlement server 400 ascertaining that the settlement is performed issues coupons to the authentication terminals 100A and 100B. That is, in step S1336 and step S1340, coupon information is transmitted to the authentication terminals 100A and 100B. Thus, the account settlement server 400 can also issue a coupon to the user visiting the store as a companion as well as the user who has purchased the product in the store. In addition, the account settlement server 400 can issue a coupon on the basis of a relationship between the users (a family relationship, a friend relationship, or the like).

Note that in step S1336 and step S1340, the fact that the coupon information is transmitted to the authentication terminals 100 has been described. However, as described above, the coupon information may be transmitted to the universal terminal 200.

5. HARDWARE CONFIGURATION

The embodiment of the present disclosure has been described. The foregoing various processes are realized in cooperation of software with hardware of an information processing device 900 that realizes the authentication terminal 100, the universal terminal 200, the store server 300, and the account settlement server 400 to be described below.

FIG. 11 is a diagram illustrating a hardware configuration of the information processing device 900 that achieves the authentication terminal 100, the universal terminal 200, the store server 300, and the account settlement server 400 according to the present embodiment. The information processing device 900 includes a central processing unit (CPU) 901, a read only memory (ROM) 902, a random access memory (RAM) 903, and a host bus 904. In addition, the information processing device 900 includes a bridge 905, an external bus 906, an interface 907, an input device 908, an output device 909, a storage device (HDD) 910, a drive 911, and a communication device 912.

The CPU 901 functions as an arithmetic processing device and a control device, and controls the overall operation in the information processing device 900 in accordance with various programs. In addition, the CPU 901 may be a microprocessor. The ROM 902 stores programs, operation parameters and the like used by the CPU 901. The RAM 903 temporarily stores programs used in execution of the CPU 901, parameters appropriately changed in the execution, and the like. These components are interconnected via the host bus 904 formed by a CPU bus or the like. Functions of each of the control units are achieved by cooperation of the CPU 901, the ROM 902, and the RAM 903.

The host bus 904 is connected to the external bus 906 such as a peripheral component interconnect/interface (PCI) bus through the bridge 905. Note that the host bus 904, the bridge 905, and the external bus 906 are not necessarily configured as separate components, and their functions may be incorporated into a single bus.

The input device 908 includes input means for the user to input information, such as a touch panel, a button, a microphone, and a switch, an input control circuit that generates an input signal on the basis of the input by the user and outputs it to the CPU 901, and the like. The user of the information processing device 900 can input various types of data and instruct processing operations to the information processing device 900 by manipulating the input device 908. Functions of each of the input units can be achieved by the input device 908.

The output device 909 includes, for example, a display device such as a cathode ray tube (CRT) display device, a liquid crystal display (LCD) device, an organic light emitting diode (OLED) device, and a lamp. Further, the output device 909 includes a sound output device such as a speaker and a headphone. The output device 909 outputs, for example, reproduced contents. Specifically, the display device displays various types of information such as reproduced video data by text or images. On the other hand, the sound output device converts reproduced sound data or the like into sound and outputs it. Functions of each of the display units can be achieved by the output device 909.

The storage device 910 is a device for storing data. The storage device 910 may include a recording medium, a recording device that records data in the recording medium, a readout device that reads out data from the recording medium, a deletion device that deletes data recorded in the recording medium, and the like. This storage device 910 includes, for example, a hard disk drive (HDD). This storage device 910 drives a hard disk, and stores a program executed by the CPU 901 and various types of data. Each of the storage units can be achieved by the storage device 910.

The drive 911 is a reader-writer for a recording medium, and is externally attached to the information processing device 900. The drive 911 reads out information recorded in a removable storage medium 913 such as a magnetic disk, an optical disk, a magneto-optical disk, or a semiconductor memory being mounted, and outputs the information to the RAM 903. In addition, the drive 911 can also write information into the removable storage medium 913.

The communication device 912 is, for example, a communication interface including a communication device or the like for connection to a communication network 914. Functions of each of the wireless communication units are achieved by the communication device 912.

6. CONCLUSION

As described above, an information processing system according to an embodiment of the present disclosure can unify biometric information which is used for biometric authentication by separating a device that performs the biometric authentication from a device that supplies a service. Thus, the information processing system according to the embodiment can supply a service even when a user does not register user information or perform a login manipulation for each service. Accordingly, since each store does not need to manage user information, the information processing system according to the embodiment can reduce a risk of the user information leaking. Further, the information processing system according to the embodiment has a function of granting recipient authority of a product so that a product can be handed over without using various numbers for receiving the product.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is not always necessary to process the respective steps in the operation of the respective devices according to the present embodiment in time series in the order illustrated as the flowcharts. For example, the respective steps illustrated in FIG. 7 to FIG. 10 may be processed in an order different from the order illustrated in the drawing, or may be processed in parallel, according to necessity.

In addition, some of the configurations of the authentication terminal 100, the universal terminal 200, the store server 300, or the account settlement server 400 can be provided appropriately in an external device. For example, the GPS sensor 150 and the position specifying unit 124 of the authentication terminal 100 are provided in an external device, and positional information of a user may be supplied from the external device to the authentication terminal 100.

In addition, some of the functions of the authentication terminal 100 may be realized by the control unit 120. That is, the control unit 120 may realize some of the functions of the communication unit 110, the fingerprint sensor 130, the proximity sensor 140, the GPS sensor 150, the input unit 160, and the display unit 170. Similarly to the authentication terminal 100, each control unit of the universal terminal 200, the store server 300, or the account settlement server 400 may realize some of the functions of the other configurations.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing terminal including:

an acquisition unit configured to acquire biometric information for biometric authentication and identification information of a device to which a service is supplied; and a transmission unit configured to transmit the identification information in accordance with success of the biometric authentication.

(2)

The information processing terminal according to (1), in which the transmission unit also transmits identification information of the information processing terminal in accordance with the success of the biometric authentication.

(3)

The information processing terminal according to (2), in which, in a case in which the acquisition unit acquires an approval request based on an input from the device, the transmission unit transmits an approval result on a basis of a manipulation related to approval of a target user of the biometric authentication.

(4)

The information processing terminal according to any one of (1) to (3), in which the information processing terminal is a terminal worn by a target user of the biometric authentication.

(5)

The information processing terminal according to (4), in which the acquisition unit acquires the biometric information when the information processing terminal is worn by the target user.

(6)

The information processing terminal according to any one of (1) to (5), in which the biometric information is fingerprint information.

(7)

The information processing terminal according to any one of (1) to (6), further including an authentication unit configured to perform the biometric authentication.

(8)

An information processing method that is performed by a computer, the information processing method including:

acquiring biometric information for biometric authentication and identification information of a device to which a service is supplied; and transmitting the identification information in accordance with success of the biometric authentication.

(9)

A program causing a computer to realize:

acquiring biometric information for biometric authentication and identification information of a device to which a service is supplied; and transmitting the identification information in accordance with success of the biometric authentication.

(10)

An information processing device including:

an acquisition unit configured to acquire identification information of a second device supplied from a first device that has acquired biometric information for biometric authentication in accordance with success of the biometric authentication; and a service supply unit configured to supply a service to the second device on a basis of the identification information of the second device.

(11)

The information processing device according to (10), in which the acquisition unit also acquires identification information of the first device in accordance with the success of the biometric authentication, and the information processing device further comprises a storage unit configured to store the identification information of the first device in association with the identification information of the second device.

(12)

The information processing device according to (11), in which, in a case in which the acquisition unit acquires input information from the second device, the service supply unit supplies a service to the second device on a basis of an approval result from the first device of which the identification information is associated with the identification information of the second device.

(13)

The information processing device according to any one of (11) to (12), in which the acquisition unit acquires positional information of the first device, and on a basis of the positional information, the service supply unit supplies a service to the second device of which the identification information is associated with the identification information of the first device.

(14)

The information processing device according to (13) in which the acquisition unit acquires position relation information of a plurality of first devices, and on a basis of the position relation information, the service supply unit supplies a service to the second device of which the identification information is associated with the identification information of the plurality of first devices.

(15)

The information processing device according to any one of (10) to (14), in which the acquisition unit acquires input information regarding authorization of other second devices input from the second device, and the service supply unit performs a process related to the authorization to the other second devices.

(16)

The information processing device according to any one of (10) to (15), in which the service supply unit supplies a service related to shopping, a service related to settlement, a service related to a change in a recipient of a product, or a service related to a coupon.

(17)

An information processing system including:

an information processing device configured to supply a service;

a first device configured to perform a process related to biometric authentication; and a second device to which the service is supplied, in which the first device includes an acquisition unit that acquires biometric information for the biometric authentication and identification information of the second device, and a transmission unit that transmits the identification information in accordance with success of the biometric authentication, and the information processing device includes an identification information acquisition unit that acquires the identification information supplied from the first device in accordance with the success of the biometric authentication, and a service supply unit that supplies a service to the second device on a basis of the identification information.

REFERENCE SIGNS LIST 100 authentication terminal
110, 210, 310, 410 communication unit
120, 220, 320, 420 control unit
130 fingerprint sensor
140 proximity sensor
150 GPS sensor
160, 230 input unit
170, 240 display unit
180, 250, 330, 430 storage unit
200 universal terminal
300 store server
400 account settlement server

The invention claimed is:

1. An information processing device, comprising:
circuitry configured to:
acquire identification information of a second device from a first device upon a success of a biometric authentication at the first device, wherein the first device acquires biometric information for the biometric authentication;
acquire identification information of the first device upon the success of the biometric authentication;
supply a service to the second device based on the identification information of the second device;
acquire, from the second device, input information regarding an authorization of a plurality of second devices other than the second device; and
perform a process related to the authorization of the plurality of second devices; and
a memory configured to store the identification information of the first device in association with the identification information of the second device.

2. The information processing device according to claim 1, wherein, in a case where input information from the second device is acquired, the circuitry is further configured to supply the service to the second device based on an approval result from the first device.

3. The information processing device according to claim 1, wherein the circuitry is further configured to:
acquire positional information of the first device and
supply the service to the second device based on the positional information.

4. The information processing device according to claim 3 wherein
the circuitry is further configured to:
acquire position relation information of a plurality of first devices and
supply the service to the second device based on the position relation information, and
the identification information of the second device is associated with identification information of each of the plurality of first devices.

5. The information processing device according to claim 1, wherein the circuitry is further configured to supply a service related to shopping, a service related to settlement, a service related to a change in a recipient of a product, or a service related to a coupon.

6. An information processing system, comprising:
an information processing device configured to supply a service;
a first device; and
a second device to which the service is supplied, wherein
the first device includes first circuitry configured to:
acquire biometric information for biometric authentication and identification information of the second device external to the first device;
perform the biometric authentication based on the biometric information; and
transmit the identification information of the second device upon a success of the biometric authentication, and
the information processing device includes second circuitry configured to:
acquire the identification information supplied from the first device upon the success of the biometric authentication;
supply the service to the second device based on the identification information;
acquire, from the second device, input information regarding an authorization of a plurality of second devices other than the second device; and
perform a process related to the authorization of the plurality of second devices.

* * * * *